(12) United States Patent
Qureshi et al.

(10) Patent No.: US 6,990,576 B2
(45) Date of Patent: *Jan. 24, 2006

(54) SYSTEM AND METHOD FOR USING A FIRMWARE INTERFACE TABLE TO DYNAMICALLY LOAD AN ACPI SSDT

(75) Inventors: Shiraz A. Qureshi, Roseville, CA (US); Martin O. Nicholes, Antelope, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 501 days.

This patent is subject to a terminal disclaimer.

(21) Appl. No.: 10/212,721

(22) Filed: Aug. 7, 2002

(65) Prior Publication Data

US 2004/0030876 A1 Feb. 12, 2004

(51) Int. Cl.
*G06F 9/24* (2006.01)
*G06F 9/00* (2006.01)
(52) U.S. Cl. .............................................. 713/2; 713/1
(58) Field of Classification Search .................. 713/2
See application file for complete search history.

(56) References Cited

U.S. PATENT DOCUMENTS

| | | | |
|---|---|---|---|
| 5,909,592 A | | 6/1999 | Shipman |
| 6,081,850 A | * | 6/2000 | Garney ........................ 710/15 |
| 6,081,890 A | * | 6/2000 | Datta ............................. 713/1 |
| 6,185,677 B1 | | 2/2001 | Nijhawan |
| 6,772,330 B2 | * | 8/2004 | Merkin .......................... 713/2 |
| 2002/0059473 A1 | * | 5/2002 | Oshins et al. ............... 709/321 |

OTHER PUBLICATIONS

Search Report issued on Jan. 26, 2004 in counterpart foreign application in GB under application No. 317111.3.

* cited by examiner

*Primary Examiner*—Lynne H. Browne
*Assistant Examiner*—Stefan Stoynov

(57) ABSTRACT

The firmware interface table (FIT) of IA-64 instruction set is used to populate the hardware component namespace using secondary system description table (SSDT) data, where the SSDT data describes components in the system. At boot-up time all hardware components are discovered. The Advanced Configuration Power Interface (ACPI) subsystem, in the system firmware, consumes the data set-up and loads the SSDTs from the FIT to create the namespace for the active system components.

18 Claims, 6 Drawing Sheets

SYSTEM AND METHOD FOR USING A FIRMWARE INTERFACE TABLE TO DYNAMICALLY LOAD AN ACPI SSDT

CROSS-REFERENCE TO RELATED APPLICATIONS

This application is related to concurrently filed U.S. patent application Ser. No. 10/212,719, entitled "System And Method For Using A Firmware Interface Table To Dynamically Load Multiple ACPI SSDT Tables" to Shiraz Ali Qureshi, et al., the subject matter of which is herein incorporated by reference.

BACKGROUND

Advanced Configuration and Power Interface (ACPI) is a specification that makes hardware status information available to an operating system in computers, including laptops, desktop, servers, etc. More information about ACPI may be found in the 500 page "Advanced Configuration and Power Interface Specification," Revision 2.0a, Mar. 31, 2002, cooperatively defined by Compaq Computer Corporation, Intel Corporation, Microsoft Corporation, Phoenix Technologies Ltd., and Toshiba Corporation. The ACPI specification was developed to establish industry common interfaces enabling robust operating system (OS)-directed motherboard device configuration and power management of both devices and entire systems. ACPI is the key element in operating system-directed configuration and power management (OSPM).

ACPI is used in personal computers (PCs) running a variety of operating systems, such as Windows™, available from Microsoft® Corporation, Linux, available as open source form a variety of vendors, and HP-UX, available from Hewlett-Packard Company. The ACPI also allows hardware resources to be manipulated. For example, ACPI assists in power management by allowing a computer system's peripherals to be powered on and off for improved power management. ACPI also allows the computer system to be turned on and off by external devices. For example, the touch of a mouse or the press of a key may wake up the computer system using ACPI.

Traditionally ACPI has been difficult to work with for a variety of reasons. First, ACPI is not written in the native assembly language of any computer system platform. Instead, ACPI has its own source and machine languages, i.e., ACPI Source Language (ASL) and ACPI Machine Language (AML), respectively. Because of its highly specialized use, there are relatively few ASL programmers. Furthermore, ASL has relatively few constructs because of its limited use. Furthermore, ACPI code is conventionally monolithic in its design. Consequently, this makes it difficult to port the ACPI code to other platforms or even to different configurations of the same platform. Thus, new ASL code needs to be written to work with newly engineered platforms. The limited number of ASL programmers makes writing new code all the more problematic and costly.

ACPI is composed of both static and interpretable tables. At boot-up time, the system firmware (typically the BIOS, or Basic Input/Output System) constructs the static tables, which are consumed by the operating system. The interpretable tables are composed of AML, which is compiled and then merged into the system firmware. The operating system reads the AML from the interpretable tables and executes the architected interfaces, using an ACPI interpreter. In this fashion, the operating system manipulates hardware resources. Because the interpretable tables are merged into the system firmware, this conventional method lacks flexibility, and scalability, and requires considerable time to re-program to accommodate divergent system configurations.

For example, conventionally, ASL developers write ACPI code to specify a particular configuration of a platform or its variance. Unfortunately, if even a minor hardware change is performed, the design has to be modified. This requires that new AML code be written and new tables be merged into the system firmware. Thus, the conventional design is not portable or re-usable.

Furthermore, ACPI has conventionally required that a different system firmware ROM (Read Only Memory) or BIOS be used if there is a variance of the platform or if it supports more than one ACPI-aware OS system, where the OS systems have mutually exclusive ACPI requirements. A different system firmware ROM also had to be used if the same system is to support multiple operating systems. For instance current art in personal computers uses the IA-32 instruction set. The Microsoft® family of operating systems primarily used ACPI, especially in systems with the IA-32 instruction set.

ACPI has been accepted by the various operating systems as the standard interface. A new instruction set architecture, IA-64, is being developed, but its advantages cannot be fully utilized with legacy ACPI code, or methods. The new Itanium® Processor Family, available from Intel® Corporation, uses the IA-64 instruction set. The ASL for each new platform or system configuration based on the processor in this family will need to be uniquely rewritten if current practices are utilized.

ACPI namespace is a hierarchical tree structure in OS-controlled memory that contains named objects. These objects may be data objects, control method objects, bus/device package objects, and so on. The OS dynamically changes the contents of the namespace at run-time by loading and/or unloading definition blocks from the ACPI tables that reside in the ACPI BIOS. All the information in the ACPI namespace comes from the differentiated system description table (DSDT), which contains the differentiated definition block, and one or more other definition blocks. In the current art, an OEM (original equipment manufacturer) must supply a DSDT to an ACPI-compatible OS, which supplies the implementation and configuration information about the base system. The OS always inserts the DSDT information into the ACPI Namespace at system boot time and never removes it.

Another ACPI construct is the secondary system description table (SSDT). SSDTs are a continuation of the DSDT. Multiple SSDTs can be used as part of a platform description. After the DSDT is loaded into the ACPI Namespace, each secondary description table with a unique OEM Table ID is loaded. This allows the OEM to provide the base support in one table, while adding smaller system options in other tables. Additional tables can only add data; they cannot overwrite data from previous tables.

A construct in the ACPI architecture defined by the system abstract layer (SAL) is a firmware interface table (FIT). This is an IA-64 instruction set construct. The FIT contains starting addresses and sizes for the firmware components that are outside the protected boot block. A good overview of the FIT entry specification may be found in the "ITANIUM® Processor Family System Abstraction Layer Specification", Document No. 245359-005, (Intel July 2002), available at http://www.intel.com/design/itanium/downloads/24535905.pdf.

SUMMARY

The firmware interface table (FIT) of IA-64 instruction set is used to populate the hardware component namespace using secondary system description tables (SSDT) data, where the SSDT data describes components in the system. At boot-up time all hardware components are discovered. The ACPI sub-system, in the system firmware, consumes the data set-up and loads the SSDTs from the FIT to create the namespace for the active system components.

A FIT data type is defined for each SSDT type so that one or more SSDTs can be loaded into the FIT upon system boot. The differentiated system descriptor table (DSDT) data, also located in the FIT, is combined with the one or more SSDTs to create a combined namespace of all active components in the system.

DESCRIPTION OF THE DRAWINGS

The detailed description will refer to the following drawings, wherein like numerals refer to like elements, and wherein.

DETAILED DESCRIPTION

Figure 1:
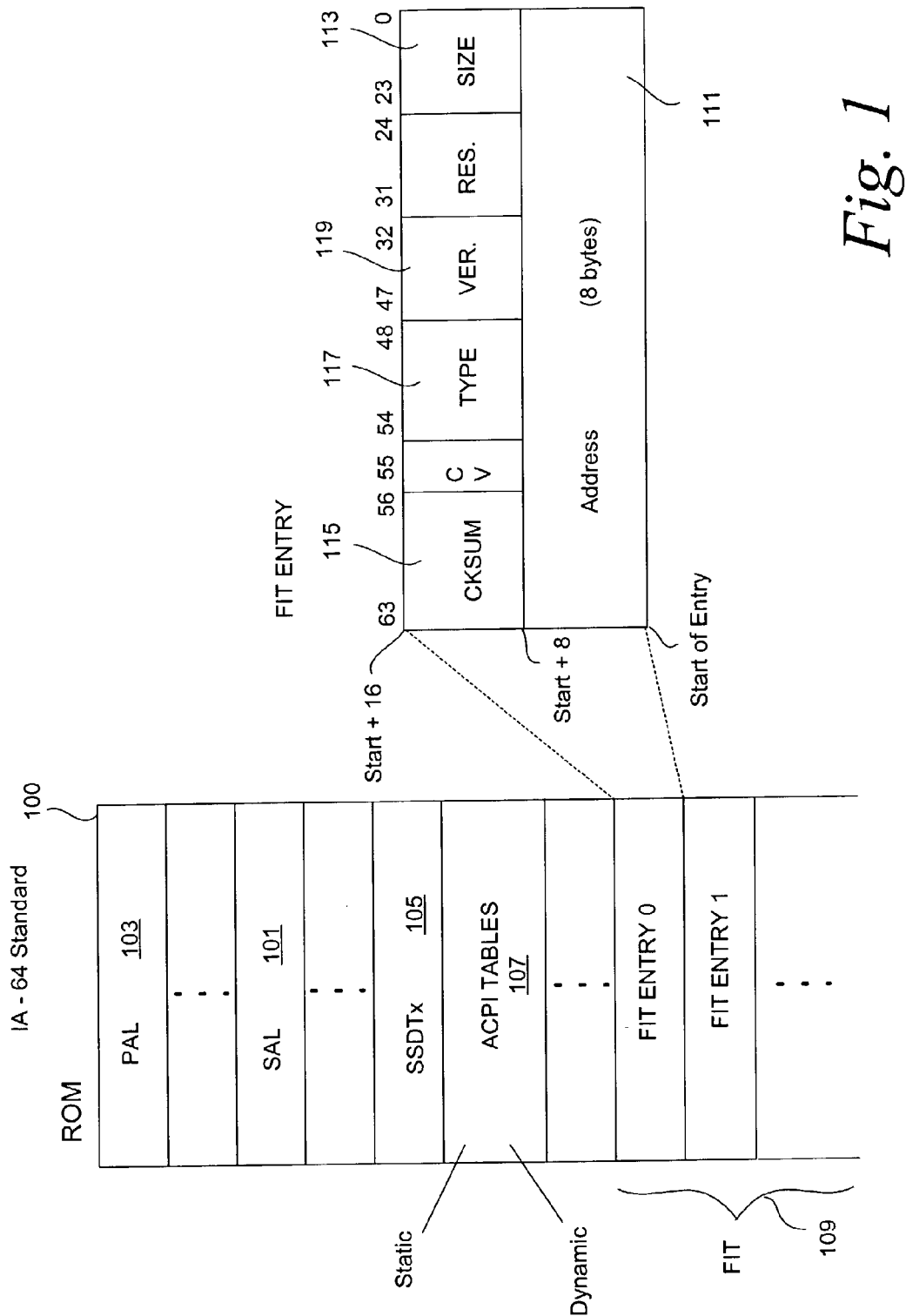
FIG. 1 shows a block diagram of an exemplary firmware ROM having a firmware interface table.

ACPI is an IA-32 instruction set concept that is still used for the new IA-64 instruction set. ACPI is a way for abstracting hardware manipulation and configuration data to define the configuration of the hardware for operating system (OS) and firmware interaction. ACPI is a specification industry standard. Currently, the major three commercial personal computer (PC) operating systems, i.e., Linux, HP/UX and Windows™, use ACPI in IA-32 space and will run using ACPI in the new IA-64 space. Upon system boot, the firmware powers up and determines the system configuration. The system is initialized, if it needs to be, and then the operation is handed over to the OS, i.e., boots up the OS. When a system is booted up, it must have knowledge of the different platform configurations. ACPI is a specification for the hardware configuration that has interface objects and a namespace in order to define the divergent platform configurations.

It is desirous to make the creation of ACPI code for new platforms more structured and platform independent. This can be achieved using architected approaches with modular design for ACPI code. This method of ACPI design is not currently used, and, in fact, is frowned upon by developers.

Another issue with previous ACPI designs is that ACPI developers had to fully describe any given platform variance using ASL. The design did not allow for portability or re-usability if even minor hardware changes were performed, which included loss of a hardware component during boot-up. In addition, the same ROM could not be employed by a variance of the given platform type or if that same system was supporting multiple operating systems.

Namespace describes the hierarchy of a computer system in a logical way. For example, when the OS consumes the namespace, it gets a picture of what the hardware looks like underneath. Thus, if the OS needs to get a resource for a given hardware component or if it needs to know how to access a component, it looks to the namespace. For example, if the OS needs to put the machine to sleep, there is an object that will identify how to put a device to sleep. The OS uses the interfaces or objects defined in the namespace to manipulate the hardware. This is the function of ACPI.

An advantage of the present system and method is that it enables various platforms, and multiple configurations of those platforms, to run using a common or generically programmed firmware. A currently unfulfilled desire of present firmware is that it is usable in only one configuration of one platform. The present system and method allows for system firmware that will operate with all three major OS's at the same time. Thus, the firmware would not need to be upgraded/modified each time the configuration or OS is changed. This requires the OS to have knowledge of what operating system is running on the platform at boot time, among other things.

The IA-64 instruction set describes how system firmware is laid out on the ROM component of system hardware. There are different firmware components merged together in the system, including ACPI AML tables, ACPI static table, and SAL (system abstraction layer) that is purely firmware. A firmware interface table (FIT) resides in the ROM to describe the layout of the ROM and where each type of firmware component exists. The FIT has a certain number of fields, and each field has a type. The field type identifies the type of component. Thus, the component types are architectured. For instance, a type 0xE (E hexadecimal) could indicate a PAL (processor abstraction layer) specific type. There is also a range of types that are vendor OEM fields.

Referring now to the drawings, and in particular to FIG. 1, there is shown an exemplary system ROM 100 for firmware associated with the IA-64 instruction set. The ROM 100 has several component areas, for instance, SAL 101, PAL 103, SSDT area 105, ACPI tables 107, and a FIT 109. The FIT has a number of fields, for instance, address 111, size 113, checksum 115, type 117, version 119, etc. For this example, the FIT address 111 points to the start of the SAL 101. The size 113 indicates how long the SAL area is so that the correct numbers of bytes are retrieved when requested. There may be a checksum 115 to ensure the integrity of the data in the ROM.

The ACPI tables 107 may be static or dynamic (i.e., interpretable), depending on the specific table. To create the namespace of the system, a DSDT (differentiated system descriptor table) is stored in the ROM and is retrievable using the FIT. An ACPI compliant OS requires that a DSDT be present. The DSDT defines the AML portion that can be executed. The DSDT defines the root system hardware components. ACPI also allows for SSDTs (secondary system description tables) 115. When the ACPI interpreter runs, it retrieves the DSDT and all SSDTs to create the combined system namespace.

An individual SSDT entry is created for each configuration for a component type present in the system. For instance, if a system can have two variances with respect to local bus adapters, then there will be two SSDTs generated to define the local bus adapter components, e.g., one for each platform configuration variance. Each SSDT has its own type 117. For example, type 55 through 80 might be dedicated to various SSDT types. This method works well for a single platform with few configuration variances.

Figure 2:
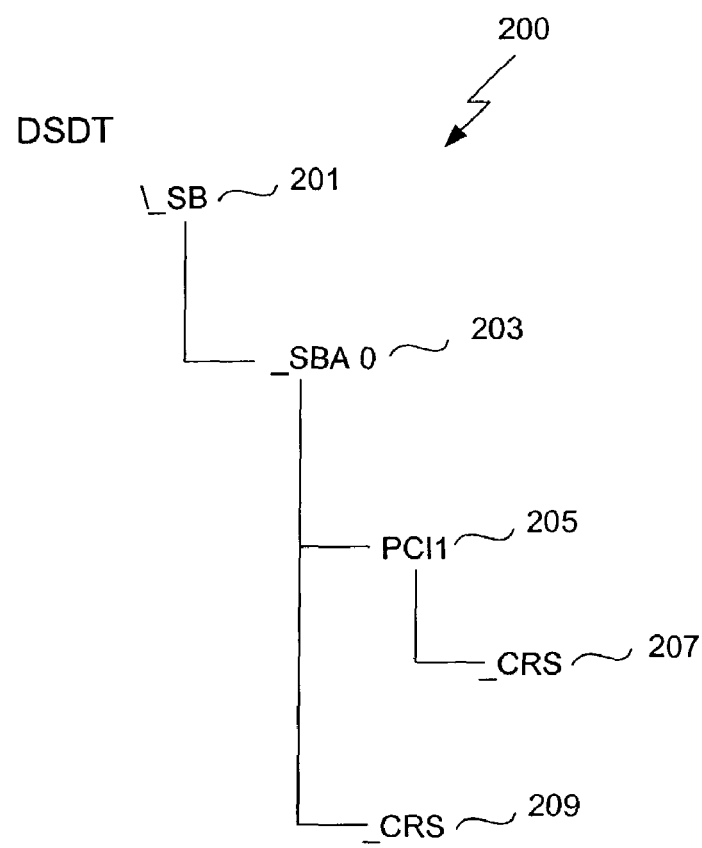
FIG. 2 shows an exemplary namespace for a DSDT.
Figure 3:
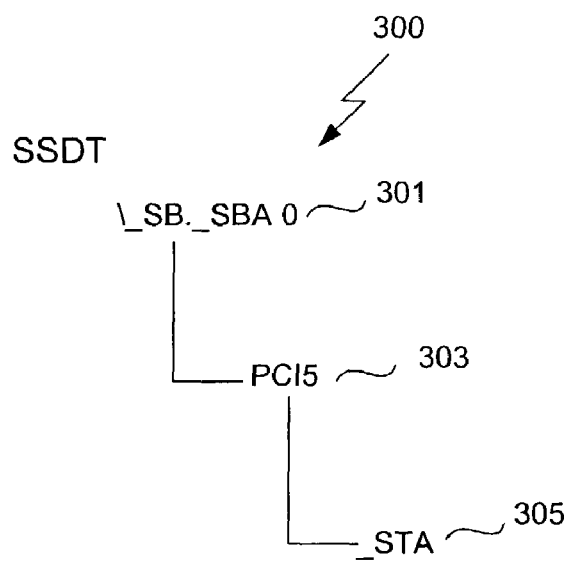
FIG. 3 shows an exemplary namespace for a SSDT.

Referring to FIG. 2, there is shown an exemplary DSDT namespace 200. The root system bus (SB) in a system board is _SB 201 having a system bus adapter (SBA) _SBA0 203. The SBA_SBA0 has a PCI (peripheral component interconnect/interface) component, PCI-1 205. The _SBA0 and PCI-1 have _CRS 209 and 207, respectively associated with them. The DSDT may not describe the entire system. For instance, it may describe the part of the computer system that is required to be operational for a successful boot. FIG. 3 shows an exemplary SSDT, which upon boot time is combined with the DSDT to describe the entire system.

Referring now to FIG. 3, the SSDT 300 has a root of _SB._SBA0 301. This name indicates that the subsequent children in this namespace are associated with the _SBA0 child 203 of the root _SB 201 in the DSDT 200. The notation _SB._SBA0 is object oriented in nature. A child node is generally a component of its parent. The component _SB._SBA0 301 has a PCI component, PCI-5 303, and PCI-5 303 has a status _STA 305 associated with it. Upon system boot, the DSDT and SSDT are combined to create the system namespace 400 as shown in FIG. 4.

Figure 4:
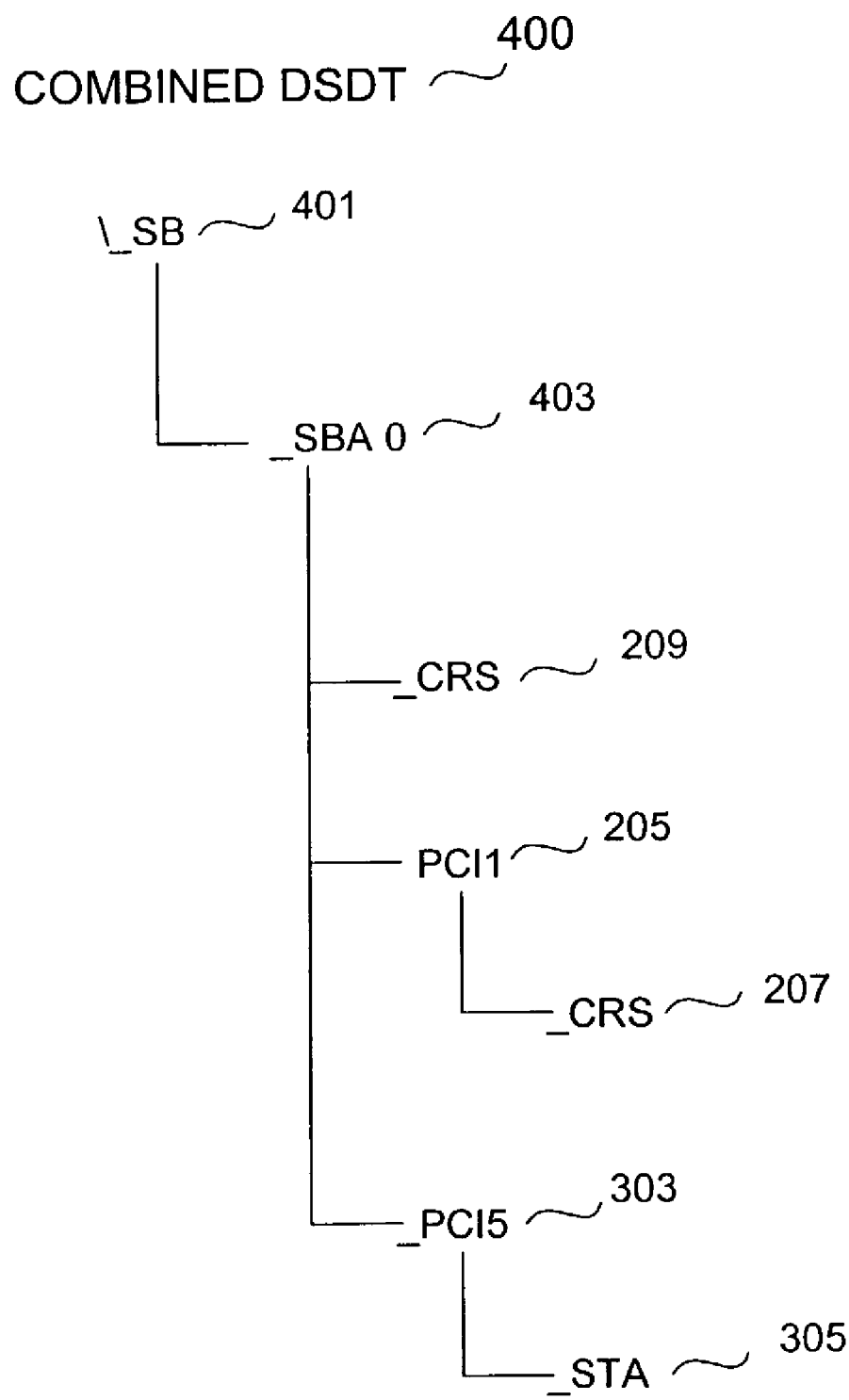
FIG. 4 shows a namespace combining the components from the DSDT of FIG. 2 and the SSDT of FIG. 4.

Referring now to FIG. 4, there is shown a combined namespace 400 for system bus _SB 401. The system bus has a child SBA_SBA0 403 that now includes PCI components PCI-1 205 and PCI-5 303 which have children associated with them, as defined in the DSDT 200 and SSDT 300 namespaces.

An advantage to dynamically architecting the complete namespace is that different configurations can be accommodated with the same baseline firmware. Differences in configuration can be defined in one or more SSDT areas. Referring again to FIG. 1, an SSDT entry in the FIT 109 will be identified by its type 117. The FIT 109 points to one or more SSDTs 105 and is read in at boot time. It will be apparent to one of ordinary skill in the art that the address for the SSDT may point to ROM or any other memory area in the system.

Another advantage to a dynamic namespace is that some components may fail during boot up. All devices of a system may not be required to be present or functional in order to boot successfully. In systems of the prior art, when a device fails during boot, the entire boot often fails. For Windows™ this can result is what is know as "the blue screen of death," or system failure. Using a dynamic SSDT to define devices that are optional, the system can determine whether those optional devices are present and functioning at boot time. If not, they are not loaded into the namespace. Thus, the OS will not be looking for them at boot time.

Figure 5A:
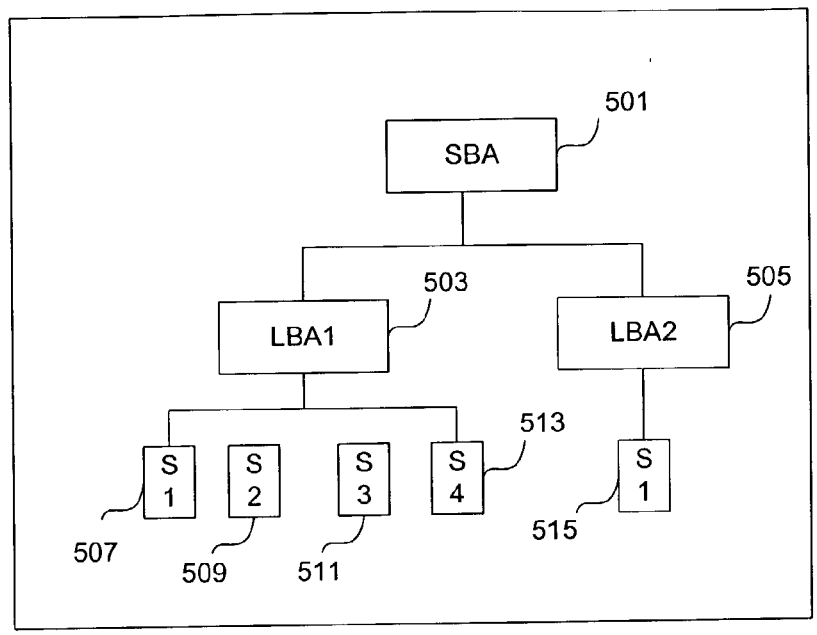
FIGS. 5A and 5B are a block diagrams of exemplary systems having a system bus adapter and at least one local bus adapter and corresponding slots.
Figure 5B:
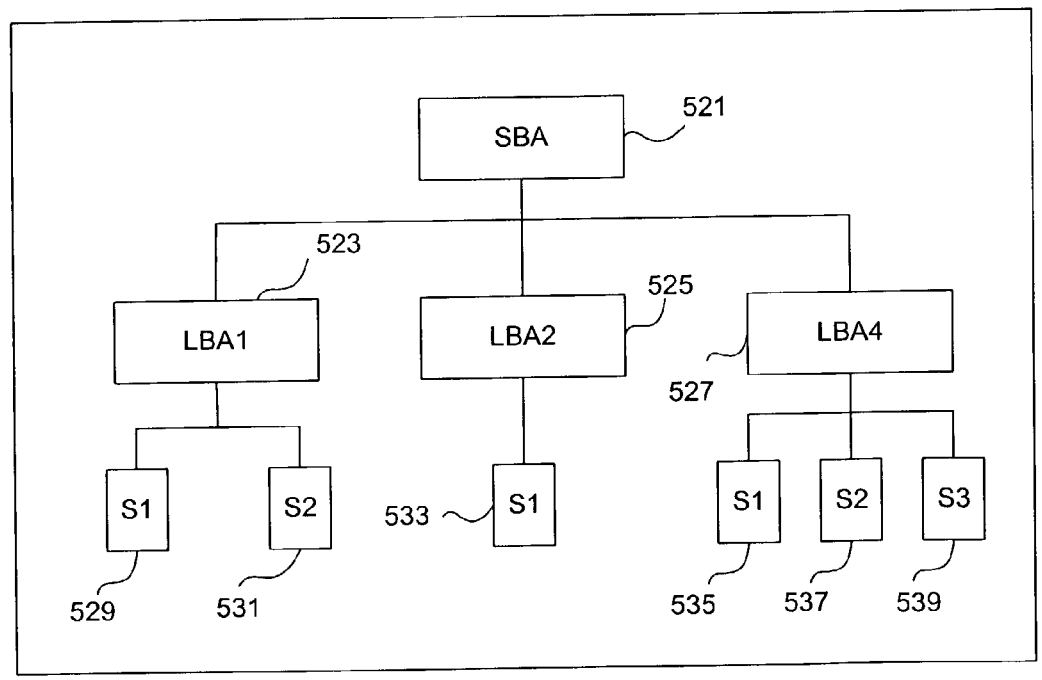

FIGS. 5A and 5B shows exemplary hardware configurations for system-1 and system-2, where both systems can use the same firmware utilizing the present method. Referring to FIG. 5A, there is shown a system bus adapter (SBA) 501 having two local bus adapters (LBAs), LBA1 503 and LBA2 505. LBA1 has four slots: S1, S2, S3 and S4 (507, 509, 511 and 513). LBA2 only has one slot, S1, 515. Referring to FIG. 5B, there is shown a SBA 521 having three LBAs: LBA1, LBA2 and LBA4 (523, 525 and 527). LBA1 has two slots: S1 and S2 (529 and 531); LBA2 has one slot, S1, 533; and LBA4 has three slots: S1 535, S2 537, and S3 539.

Figure 6A:
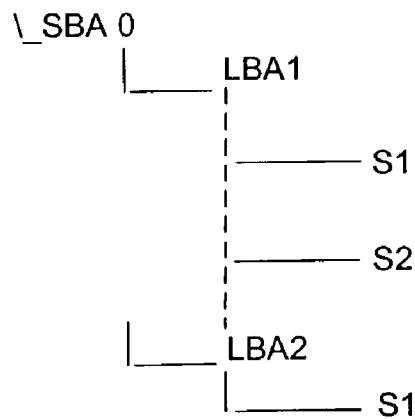
FIG. 6A, shows an example of a DSDT namespace corresponding to the hardware components shown in common for FIGS. 5A and 5B.
Figure 6B:
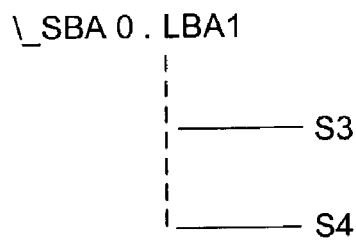
FIG. 6B, shows an example of a SSDT namespace corresponding to the hardware components shown in FIG. 5A that are not included in the DSDT namespace of FIG. 6A.
Figure 6C:
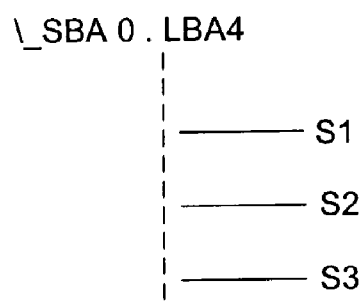
FIG. 6C, shows an example of a SSDT namespace corresponding to the hardware components shown in FIG. 5B that are not included in the DSDT namespace of FIG. 6A.

A simplified DSDT used to represent the namespace of these systems might look like FIG. 6A. An SSDT used to describe the rest of the components in system-1 might look like FIG. 6B. An SSDT used to describe the rest of the components in system-2 might look like FIG. 6C. It will be apparent to one of ordinary skill in the art that both systems have a SBA with two local bus adapters, the first LBA having at least two slots, and the second LBA having one slot. Because this configuration is the base system, in this example, the DSDT needs only to define these components. All other components are described in SSDTs.

For instance, for system-1, two additional slots of LBA1 must be defined over the baseline configuration. For system-2, an additional LBA, LBA4, must be defined with three slots: S1, S2 and S3. Thus, for the same firmware, only the loaded SSDT must change in order to accommodate system-1 and system-2.

Figure 7:
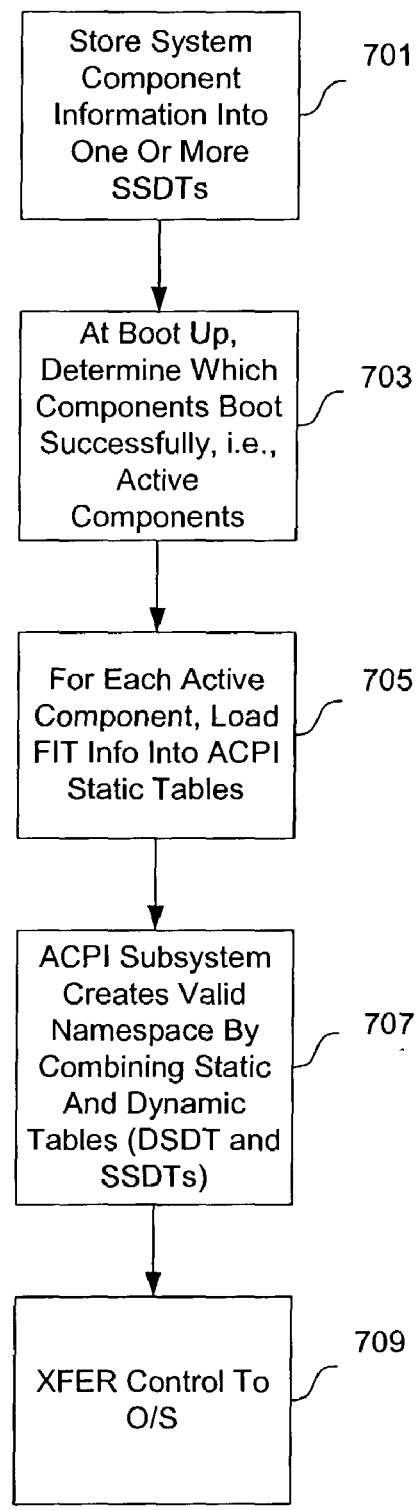
FIG. 7 is a flow chart showing an exemplary method for generating the system component namespace using a DSDT and at least one SSDTs FIT entry.

Referring now to FIG. 7, there is shown a flow chart illustrating an exemplary method for generating the system component namespace using a DSDT and at least one SSDT FIT entry. System components are identified and their corresponding information, or definition, is stored in one or more SSDT areas, in step 701. This information may be stored in ROM or any other memory that is accessible to the system firmware. During system boot-up, components that have booted successfully are identified, in step 703. For purposes of this description, these components are known as "active" components. All the possible SSDTs are loaded into the ROM and are described by the FIT. At the time of generation of ACPI static tables by SAL, SAL decides which SSDTs will be loaded for the active components and places that information in the ACPI static tables, in step 705.

When the system component information is retrieved to generate the system namespace, inactive, or failed, components are not described. This enables the system to boot up in the absence of one or more non-essential components. Also during system boot-up, the ACPI interpreter consumes the static and dynamic tables to create the valid ACPI namespace, in step 707, by combining static and dynamic tables (DSDT and SSDTs). Once the namespace has been completely generated by the ACPI interpreter, control is transferred to the OS and the system is up and running, in step 709. The OS then uses the generated namespace to interact with the system components. Having described preferred embodiments of a novel method to for using a firmware interface table to load ACPI SSDTs, (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

What is claimed is:

1. A multi-platform, multi-operating system firmware for IA-64 instruction set processors, comprising:

system firmware for booting up a computer system, the system firmware having a first memory block coded with boot-up instructions, and having a second memory block for storing data;

the second memory block being accessible during system boot-up, the second memory block being populated with information corresponding to components of the computer system;

a firmware interface table (FIT) residing in the second memory block, wherein the FIT comprises entries having an address, a size, and a type, and wherein a respective address of a FIT entry points to a respective memory location corresponding to data for the type of the FIT entry;

a FIT entry identifying a differentiated system descriptor table (DSDT) that describes root system hardware components that are required for a successful boot; and at least one FIT entry identifying a secondary system description table (SSDT) that describes optional system components, wherein a different SSDT is created for each of a configuration for a component type that is present in the computer system, and wherein each SSDT identified in the FIT is retrieved during boot-up time to describe a namespace for active optional system components, wherein different configurations can be accommodated in a same baseline firmware, and wherein different configurations are defined in one or more SSDTs.

2. The firmware as recited in claim 1, wherein the FIT entry further comprises checksum and version information.

3. The firmware as recited in claim 1, wherein the SSDT information is combined with information from the DSDT, wherein the DSDT information resides in memory in the second memory block.

4. The firmware as recited in claim 3, wherein the SSDT information resides in a third memory block, wherein the third memory block resides external to the firmware.

5. The firmware as recited in claim 1, wherein the SSDT information is combined with information from the DSDT, wherein the DSDT information and SSDT information reside in a third memory block, wherein the third memory block resides external to the firmware.

6. A multi-platform, multi-operating system computer system having an IA-instruction firmware, comprising:
   a central processing unit (CPU)
   a memory bus connecting the CPU with at least one system component, wherein the memory bus comprises data, address and control information;
   system firmware connected to the CPU for booting up the computer system, the system firmware having a first memory block coded with boot-up instructions, and having a second memory block for storing data;
   the second memory block being accessible during system boot-up, the second memory block being populated with information corresponding to the system components;
   a firmware interface table (FIT) residing in the second memory block, wherein the FIT comprises entries having an address, a size, and a type, and wherein the address of a FIT entry points to a memory location corresponding to data for the type of the entry;
   a FIT entry identifying a differentiated system descriptor table (DSDT) that describes root system hardware components that are required for a successful boot; and
   at least one FT entry identifying a secondary system description table (SSDT), wherein a different SSDT is created for each of a configuration for a component type that is present in the computer system, and wherein at least one SSDT identified in the FIT is retrieved during boot-up time to describe a namespace for an active optional system component,
   wherein different configurations can be accommodated in a same baseline firmware, and wherein different configurations are defined in one or more SSDTs.

7. The firmware as recited in claim 6, wherein the FIT entry further comprises checksum and version information.

8. The firmware as recited in claim 6, wherein the SSDT information is combined with information from the DSDT, wherein the DSDT information resides in memory in the second memory block.

9. The firmware as recited in claim 8, wherein the SSDT information resides in a third memory block, wherein the third memory block resides external to the firmware.

10. The firmware as recited in claim 6, wherein the SSDT information is combined with information from the DSDT, wherein the DSDT information and the SSDT information reside in a third memory block, wherein the third memory block resides external to the firmware.

11. A method for retrieving SSDT data from a FIT during system boot-up time to generate a namespace for active system components, comprising:
   storing root system hardware components that are required for a successful boot in a memory location for storing a differentiated system descriptor table (DSDT);
   for each of an optional system component of a computer system, storing respective optional system component information in a respective memory location for storing a secondary system description table (SSDT), the storing occurring prior to system boot-up time, wherein a different SSDT is created for each configuration for a component type that is present in the computer system;
   determining a system configuration for active system components in the computer system, the determining occurring at system boot-up time;
   loading a firmware interface table (FIT) with SSDT entries, each SSDT entry pointing to a respective memory location storing corresponding SSDT information, wherein the entries are loaded correspond to respective optional system components; and
   initializing the active system component namespace with the determined system configuration for the active system components,
   wherein different configurations can be accommodated in a same baseline firmware, and wherein different configurations are defined in one or more SSDTs.

12. The method as recited in claim 11, further comprising transferring control from a system firmware to selected operating system, wherein the operating system consumes the system component namespace to define system component interactions.

13. The method as recited in claim 11, wherein the firmware interface table (FIT) resides in a first memory block, and wherein the FIT comprises entries having an address, a size, and a type, and wherein the address of a FIT entry points to a memory location corresponding to data for the type of the entry.

14. The method as recited in claim 13, wherein a FIT entry points to a memory location external to the first memory block.

15. The method as recited in claim 13, wherein the first memory block resides in firmware on a system chipset.

16. The method as recited in claim 13, wherein the SSDT information resides in a memory block external to the firmware.

17. The method as recited in claim 11, wherein the FIT entry further comprises checksum and version information.

18. The method as recited in claim 11, wherein initializing the active system component namespace further comprises combining SSDT information with information from the DSDT.

* * * * *